US012056415B2

United States Patent
Duan et al.

(10) Patent No.: US 12,056,415 B2
(45) Date of Patent: *Aug. 6, 2024

(54) DESKTOP SHARING METHOD AND MOBILE TERMINAL

(71) Applicant: Huawei Technologies Co., Ltd., Shenzhen (CN)

(72) Inventors: Yun Duan, Wuhan (CN); Yuan Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 231 days.

This patent is subject to a terminal disclaimer.

(21) Appl. No.: 17/039,233

(22) Filed: Sep. 30, 2020

(65) Prior Publication Data

US 2021/0019106 A1    Jan. 21, 2021

Related U.S. Application Data

(63) Continuation of application No. 15/541,974, filed as application No. PCT/CN2015/070448 on Jan. 9, 2015, now Pat. No. 10,795,633.

(30) Foreign Application Priority Data

Jan. 6, 2015    (WO) ................ PCT/CN2015/070224

(51) Int. Cl.
*G06F 3/14*        (2006.01)
*G06F 3/04817*    (2022.01)
(Continued)

(52) U.S. Cl.
CPC ........ *G06F 3/1454* (2013.01); *G06F 3/04817* (2013.01); *G06F 3/0484* (2013.01);
(Continued)

(58) Field of Classification Search
CPC .............. G06F 3/04817; G06F 3/0484; G06F 3/04883; G06F 3/1454; G06F 3/1462; G06F 9/452; G06F 40/134; H04L 65/40
See application file for complete search history.

(56) References Cited

U.S. PATENT DOCUMENTS 5,113,393 A * 5/1992 Kam ...................... G06Q 10/10
                                                                370/389
7,434,217 B2    10/2008 Morris
(Continued)

FOREIGN PATENT DOCUMENTS

CN            102037459 A        4/2011
CN            103336692 A        10/2013
(Continued)

*Primary Examiner* — Michael Roswell
*Assistant Examiner* — William Wong
(74) *Attorney, Agent, or Firm* — Slater Matsil, LLP

(57) ABSTRACT

A desktop sharing method, including receiving, by a second terminal, a desktop drawing file shared by a first terminal, where the desktop drawing file includes a desktop description file and a file package of a screen interface on a desktop of the first terminal, the desktop description file includes a location of an application interface element on the desktop of the first terminal, and the file package includes a thumbnail of the application interface element, and replacing, by the second terminal, a desktop of the second terminal with the received desktop drawing file, where replacing a desktop of the second terminal with the received desktop drawing file includes displaying a special mark for a desktop application icon, the application corresponding to the desktop application icon is not installed on the second terminal but the information of the application is in the desktop drawing file shared by the first terminal.

20 Claims, 13 Drawing Sheets

(51) Int. Cl.
*G06F 3/0484* (2022.01)
*G06F 3/04883* (2022.01)
*G06F 9/451* (2018.01)
*G06F 40/134* (2020.01)
*H04L 65/40* (2022.01)

(52) U.S. Cl.
CPC ........ *G06F 3/04883* (2013.01); *G06F 3/1462* (2013.01); *G06F 9/452* (2018.02); *G06F 40/134* (2020.01); *H04L 65/40* (2013.01)

(56) References Cited

U.S. PATENT DOCUMENTS

| | | | |
|---|---|---|---|
| 10,180,831 B2* | 1/2019 | Seo | H04N 21/4316 |
| 2003/0154185 A1* | 8/2003 | Suzuki | G06F 16/10 |
| 2004/0250130 A1 | 12/2004 | Billharz et al. | |
| 2005/0050474 A1 | 3/2005 | Bells et al. | |
| 2006/0036569 A1 | 2/2006 | Kim | |
| 2006/0205517 A1 | 9/2006 | Malabuyo et al. | |
| 2007/0130541 A1 | 6/2007 | Louch et al. | |
| 2008/0182628 A1 | 7/2008 | Lee et al. | |
| 2009/0292999 A1 | 11/2009 | LaBine et al. | |
| 2010/0312817 A1 | 12/2010 | Steakley | |
| 2012/0096386 A1* | 4/2012 | Baumann | G06Q 30/0601 715/772 |
| 2013/0047149 A1 | 2/2013 | Xu et al. | |
| 2013/0117432 A1 | 5/2013 | Jiang | |
| 2013/0125009 A1 | 5/2013 | DeLuca et al. | |
| 2013/0254291 A1 | 9/2013 | Park et al. | |
| 2013/0339439 A1* | 12/2013 | Deng | H04L 67/1095 709/204 |
| 2014/0040360 A1 | 2/2014 | Privat | |
| 2014/0325384 A1 | 10/2014 | Kobayashi | |
| 2014/0325435 A1 | 10/2014 | Jung et al. | |
| 2015/0026615 A1* | 1/2015 | Choi | G06F 3/0484 715/765 |
| 2015/0058744 A1 | 2/2015 | Dhingra et al. | |
| 2015/0143299 A1* | 5/2015 | Kim | G06F 3/0482 715/835 |
| 2015/0278033 A1* | 10/2015 | Hou | G06F 3/04817 714/19 |
| 2016/0048158 A1 | 2/2016 | Chen et al. | |
| 2016/0088035 A1 | 3/2016 | Yu et al. | |
| 2016/0321066 A1* | 11/2016 | Wang | G06F 3/0647 |
| 2017/0277400 A1* | 9/2017 | Lee | G06F 3/04817 |

FOREIGN PATENT DOCUMENTS

| | | |
|---|---|---|
| CN | 103472974 A | 12/2013 |
| CN | 103984437 A | 8/2014 |
| CN | 103984487 A | 8/2014 |
| CN | 104063134 A | 9/2014 |
| GB | 2470811 | 12/2010 |
| JP | 2013029922 A | 2/2013 |
| JP | 2014216868 A | 11/2014 |
| RU | 2368945 C2 | 9/2009 |
| WO | 2013055619 A1 | 4/2013 |
| WO | 2014134794 A1 | 9/2014 |

* cited by examiner

DESKTOP SHARING METHOD AND MOBILE TERMINAL

CROSS-REFERENCE TO RELATED APPLICATIONS

This application is a continuation of U.S. patent application Ser. No. 15/541,974, filed on Jul. 6, 2017, now U.S. Pat. No. 10,795,633 issued on Oct. 6, 2020, which is a national stage of International Application No. PCT/CN2015/070448, filed on Jan. 9, 2015, which claims priority to International Patent Application No. PCT/CN2015/070224, filed on Jan. 6, 2015. All of the aforementioned applications are hereby incorporated by reference in their entireties.

TECHNICAL FIELD

The present invention relates to the communications field, and in particular, to a desktop sharing method and a mobile terminal.

BACKGROUND

On a current Internet website, a function of sharing network resources such as various documents and applications is relatively popular. That is, a sharing button for a corresponding network resource is provided on the Internet website, and a selected network resource is shared to another user on the Internet by using a clicking operation of a user.

A vast majority of users already commonly accept obtaining of services and resources by using a mobile terminal to access the Internet. As various applications are developed and publicized, the users are strongly willing to obtain applications in which they are interested, so as to enrich functions on their mobile terminals. In addition, when obtaining some interesting or useful applications, the users are willing to share these applications to their familiar users who have similar interests.

However, all current sharing functions can implement only sharing of a single file (such as a picture, a file, music, a video, a contact, or an application), and can meet only a requirement for using and viewing a single file by a user but cannot meet a requirement for sharing and using one or more entire screen interfaces on a desktop of a mobile terminal by a user.

SUMMARY

Embodiments of the present invention provide a desktop sharing method and a mobile terminal, which are used to share a desktop of a mobile terminal, so as to meet a requirement for sharing and using one or more entire screen interfaces on the desktop of the mobile terminal by a user.

A first aspect of the embodiments of the present invention provides a desktop sharing method, including receiving, by a first terminal, a first operation of a user, determining, by the first terminal, a desktop drawing file according to a desktop of the first terminal when the first operation meets a first preconfigured condition, where the desktop drawing file includes a desktop description file and a file package of at least one screen interface on the desktop of the first terminal, the desktop description file includes a location of at least one application interface element on the desktop of the first terminal, and the file package includes a thumbnail of the at least one application interface element, and sharing, by the first terminal, the determined desktop drawing file, so that a second terminal updates a desktop of the second terminal according to the shared desktop drawing file.

With reference to the first aspect of the embodiments of the present invention, in a first implementation manner of the first aspect of the embodiments of the present invention, the application interface element includes a desktop wallpaper, a desktop application, a desktop widget, or a folder on a desktop.

With reference to the first aspect or the first implementation manner of the first aspect of the embodiments of the present invention, in a second implementation manner of the first aspect of the embodiments of the present invention, when the at least one application interface element includes a desktop application, the desktop description file further includes a downloading link of the desktop application.

With reference to the first aspect, or either of the first and the second implementation manners of the first aspect of the embodiments of the present invention, in a third implementation manner of the first aspect of the embodiments of the present invention, the desktop drawing file further includes a desktop preview image of the first terminal.

With reference to the first aspect, or any one of the first to the third implementation manners of the first aspect of the embodiments of the present invention, in a fourth implementation manner of the first aspect of the embodiments of the present invention, the sharing, by the first terminal, the determined desktop drawing file specifically includes sharing, by the first terminal, the desktop drawing file directly to the second terminal by using a wireless connection, or sharing, by the first terminal, the desktop drawing file to a social network for the second terminal to download and use.

With reference to the first aspect, or any one of the first to the fourth implementation manners of the first aspect of the embodiments of the present invention, in a fifth implementation manner of the first aspect of the embodiments of the present invention, the receiving, by a first terminal, a first operation of a user specifically includes receiving, by the first terminal, a tap operation of the user, and when an operation of tapping a desktop sharing button by the user is received, determining that the first operation meets the first preconfigured condition.

With reference to the fifth implementation manner of the first aspect of the embodiments of the present invention, in a sixth implementation manner of the first aspect of the embodiments of the present invention, before the step of receiving, by the first terminal, a tap operation of the user, the method further includes receiving, by the first terminal, a second operation of the user, and entering, by the first terminal, a desktop editing interface when the second operation meets a second preconfigured condition, where the desktop sharing button is displayed on the desktop editing interface.

With reference to the first aspect, or any one of the first to the sixth implementation manners of the first aspect of the embodiments of the present invention, in a seventh implementation manner of the first aspect of the embodiments of the present invention, the receiving, by a first terminal, a first operation of a user specifically includes receiving, by the first terminal, a swipe operation of the user on a screen, and determining, by the first terminal when a swiping track meets a preset condition, that the first operation meets the first preconfigured condition.

A second aspect of the embodiments of the present invention provides a desktop sharing method, including receiving, by a second terminal, a desktop drawing file shared by a first terminal, where the desktop drawing file includes a desktop description file and a file package of at least one screen interface on a desktop of the first terminal, the desktop description file includes a location of at least one application interface element on the desktop of the first terminal, and the file package includes a thumbnail of the at least one application interface element, and updating, by the second terminal, a desktop of the second terminal according to the received desktop drawing file.

With reference to the second aspect of the embodiments of the present invention, in a first implementation manner of the second aspect of the embodiments of the present invention, the application interface element includes a desktop wallpaper, a desktop application, a desktop widget, or a folder on a desktop.

With reference to the second aspect or the first implementation manner of the second aspect of the embodiments of the present invention, in a second implementation manner of the second aspect of the embodiments of the present invention, the updating, by the second terminal, a desktop of the second terminal according to the received desktop drawing file specifically includes updating, by the second terminal, a desktop drawing file of the second terminal according to the received desktop drawing file, and displaying, by the second terminal, the desktop of the second terminal according to an updated desktop drawing file of the second terminal.

With reference to the second implementation manner of the second aspect of the embodiments of the present invention, in a third implementation manner of the second aspect of the embodiments of the present invention, the displaying, by the second terminal, the desktop of the second terminal according to an updated desktop drawing file of the second terminal specifically includes replacing, by the second terminal, a desktop wallpaper of the second terminal and/or arranging a desktop icon of the second terminal, according to the updated desktop drawing file of the second terminal, where the desktop icon includes an icon of the desktop application, and/or an icon of the desktop widget, and/or an icon of the folder on the desktop.

With reference to the second aspect, or any one of the first to the third implementation manners of the second aspect of the embodiments of the present invention, in a fourth implementation manner of the second aspect of the embodiments of the present invention, when the at least one application interface element includes a desktop application, the desktop description file further includes a downloading link of the desktop application, and after the step of updating, by the second terminal, a desktop of the second terminal according to the received desktop drawing file, the method further includes receiving, by the second terminal when the desktop application of the first terminal is not installed on the second terminal, an operation of tapping the uninstalled desktop application on the desktop, and downloading and installing, by the second terminal, the tapped desktop application by using the downloading link of the desktop application in the desktop description file.

With reference to the second aspect, or any one of the first to the fourth implementation manners of the second aspect of the embodiments of the present invention, in a fifth implementation manner of the second aspect of the embodiments of the present invention, the first desktop information file further includes a desktop preview image of the first terminal, and after the step of receiving, by a second terminal, a desktop drawing file shared by a first terminal, and before the step of updating, by the second terminal, a desktop of the second terminal according to the received desktop drawing file, the method further includes displaying, by the second terminal, the desktop preview image of the first terminal, and when a third operation is received, triggering the step of updating, by the second terminal, a desktop of the second terminal according to the received desktop drawing file, where the third operation is used to determine to use the received desktop drawing file.

A third aspect of the embodiments of the present invention provides a mobile terminal, serving as a first terminal and configured to share a desktop, including a first receiving module, configured to receive a first operation of a user, a determining module, configured to determine a desktop drawing file according to a desktop of the first terminal when the first operation received by the first receiving module meets a first preconfigured condition, where the desktop drawing file includes a desktop description file and a file package of at least one screen interface on the desktop of the first terminal, the desktop description file includes a location of at least one application interface element on the desktop of the first terminal, and the file package includes a thumbnail of the at least one application interface element, and a sharing module, configured to share the determined desktop drawing file, so that a second terminal updates a desktop of the second terminal according to the shared desktop drawing file.

With reference to the third aspect of the embodiments of the present invention, in a first implementation manner of the third aspect of the embodiments of the present invention, the application interface element includes a desktop wallpaper, a desktop application, a desktop widget, or a folder on a desktop, when the at least one application interface element includes a desktop application, the desktop description file further includes a downloading link of the desktop application, and the desktop drawing file further includes a desktop preview image of the first terminal.

With reference to the third aspect or the first implementation manner of the third aspect of the embodiments of the present invention, in a second implementation manner of the third aspect of the embodiments of the present invention, the sharing module is specifically configured to share the desktop drawing file directly to the second terminal by using a wireless connection, or share the desktop drawing file to a social network for the second terminal to download and use.

With reference to the third aspect, or either of the first and the second implementation manners of the third aspect of the embodiments of the present invention, in a third implementation manner of the third aspect of the embodiments of the present invention, the first receiving module specifically includes a first receiving unit, configured to receive a tap operation of the user, and a first determining unit, configured to when the first receiving unit receives an operation of tapping a desktop sharing button by the user, determine that the first operation meets the first preconfigured condition.

With reference to the third implementation manner of the third aspect of the embodiments of the present invention, in a fourth implementation manner of the third aspect of the embodiments of the present invention, the mobile terminal further includes a second receiving module, configured to receive a second operation of the user, and a button display module, configured to display a desktop editing interface when the second operation received by the second receiving module meets a second preconfigured condition, where the desktop sharing button is displayed on the desktop editing interface.

With reference to the third aspect, or any one of the first to the fourth implementation manners of the third aspect of the embodiments of the present invention, in a fifth implementation manner of the third aspect of the embodiments of the present invention, the first receiving module specifically includes a second receiving unit, configured to receive a swipe operation of the user on a screen, and a second determining unit, configured to when a swiping track meets a preset condition, determine that the first operation meets the first preconfigured condition.

A fourth aspect of the embodiments of the present invention provides a mobile terminal, serving as a second terminal and configured to use a shared desktop, including a third receiving module, configured to receive a desktop drawing file shared by a first terminal, where the desktop drawing file includes a desktop description file and a file package of at least one screen interface on a desktop of the first terminal, the desktop description file includes a location of at least one application interface element on the desktop of the first terminal, and the file package includes a thumbnail of the at least one application interface element, and an update module, configured to update a desktop of the second terminal according to the desktop drawing file received by the third receiving module.

With reference to the fourth aspect of the embodiments of the present invention, in a first implementation manner of the fourth aspect of the embodiments of the present invention, the application interface element includes a desktop wallpaper, a desktop application, a desktop widget, or a folder on a desktop.

With reference to the fourth aspect or the first implementation manner of the fourth aspect of the embodiments of the present invention, in a second implementation manner of the fourth aspect of the embodiments of the present invention, the update module specifically includes an update unit, configured to update a desktop drawing file of the second terminal according to the received desktop drawing file, and a display unit, configured to display the desktop of the second terminal according to a desktop drawing file of the second terminal updated by the update unit.

With reference to the second implementation manner of the fourth aspect of the embodiments of the present invention, in a third implementation manner of the fourth aspect of the embodiments of the present invention, the display unit is specifically configured to replace a desktop wallpaper of the second terminal and/or arrange a desktop icon of the second terminal, according to the desktop drawing file of the second terminal updated by the update unit, where the desktop icon includes an icon of the desktop application, and/or an icon of the desktop widget, and/or an icon of the folder on the desktop.

With reference to the fourth aspect, or any one of the first to the third implementation manners of the fourth aspect of the embodiments of the present invention, in a fourth implementation manner of the fourth aspect of the embodiments of the present invention, when the at least one application interface element includes a desktop application, the desktop description file further includes a downloading link of the desktop application, and the mobile terminal further includes a fourth receiving module, configured to when the desktop application of the first terminal is not installed on the second terminal, receive an operation of tapping the uninstalled desktop application on the desktop, and an installation module, configured to download and install the tapped desktop application by using the downloading link of the desktop application in the desktop description file.

With reference to the fourth aspect, or any one of the first to the fourth implementation manners of the fourth aspect of the embodiments of the present invention, in a fifth implementation manner of the fourth aspect of the embodiments of the present invention, the first desktop information file further includes a desktop preview image of the first terminal, and the mobile terminal further includes a preview display module, configured to display the desktop preview image of the first terminal, and a trigger module, configured to trigger the update module when a third operation is received, where the third operation is used to determine to use the received desktop drawing file.

A fifth aspect of the embodiments of the present invention provides a mobile terminal, serving as a first terminal and configured to share a desktop, including an input apparatus, an output apparatus, a processor, and a memory, where the processor is configured to execute the following steps by invoking an operation instruction stored in the memory receiving a first operation of a user, determining a desktop drawing file according to a desktop of the first terminal when the first operation meets a first preconfigured condition, where the desktop drawing file includes a desktop description file and a file package of at least one screen interface on the desktop of the first terminal, the desktop description file includes a location of at least one application interface element on the desktop of the first terminal, and the file package includes a thumbnail of the at least one application interface element, and sharing the determined desktop drawing file, so that a second terminal updates a desktop of the second terminal according to the shared desktop drawing file.

With reference to the fifth aspect of the embodiments of the present invention, in a first implementation manner of the fifth aspect of the embodiments of the present invention, the application interface element includes a desktop wallpaper, a desktop application, a desktop widget, or a folder on a desktop.

With reference to the fifth aspect or the first implementation manner of the fifth aspect of the embodiments of the present invention, in a second implementation manner of the fifth aspect of the embodiments of the present invention, when the at least one application interface element includes a desktop application, the desktop description file further includes a downloading link of the desktop application.

With reference to the fifth aspect, or either of the first and the second implementation manners of the fifth aspect of the embodiments of the present invention, in a third implementation manner of the fifth aspect of the embodiments of the present invention, the desktop drawing file further includes a desktop preview image of the first terminal.

With reference to the fifth aspect, or any one of the first to the third implementation manners of the fifth aspect of the embodiments of the present invention, in a fourth implementation manner of the fifth aspect of the embodiments of the present invention, when executing the step of sharing the determined desktop drawing file, the processor is specifically configured to execute the following step of sharing the desktop drawing file directly to the second terminal by using a wireless connection, or sharing the desktop drawing file to a social network for the second terminal to download and use.

With reference to the fifth aspect, or any one of the first to the fourth implementation manners of the fifth aspect of the embodiments of the present invention, in a fifth implementation manner of the fifth aspect of the embodiments of the present invention, when executing the step of receiving a first operation of a user, the processor is specifically configured to execute the following steps of receiving a tap operation of the user, and when an operation of tapping a desktop sharing button by the user is received, determining that the first operation meets the first preconfigured condition.

With reference to the fifth implementation manner of the fifth aspect of the embodiments of the present invention, in a sixth implementation manner of the fifth aspect of the embodiments of the present invention, before executing the step of receiving a tap operation of the user, the processor is further configured to execute the following steps of receiving a second operation of the user, and entering a desktop editing interface when the second operation meets a second preconfigured condition, where the desktop sharing button is displayed on the desktop editing interface.

With reference to the fifth aspect, or any one of the first to the sixth implementation manners of the fifth aspect of the embodiments of the present invention, in a seventh implementation manner of the fifth aspect of the embodiments of the present invention, when executing the step of receiving a first operation of a user, the processor specifically executes the following steps of receiving a swipe operation of the user on a screen, and when a swiping track meets a preset condition, determining that the first operation meets the first preconfigured condition.

A sixth aspect of the embodiments of the present invention provides a mobile terminal, serving as a second terminal and configured to use a shared desktop, including an input apparatus, an output apparatus, a processor, and a memory, where the processor is configured to execute the following steps by invoking an operation instruction stored in the memory, including receiving a desktop drawing file shared by a first terminal, where the desktop drawing file includes a desktop description file and a file package of at least one screen interface on a desktop of the first terminal, the desktop description file includes a location of at least one application interface element on the desktop of the first terminal, and the file package includes a thumbnail of the at least one application interface element, and updating a desktop of the second terminal according to the received desktop drawing file.

With reference to the sixth aspect of the embodiments of the present invention, in a first implementation manner of the sixth aspect of the embodiments of the present invention, the application interface element includes a desktop wallpaper, a desktop application, a desktop widget, or a folder on a desktop.

With reference to the sixth aspect or the first implementation manner of the sixth aspect of the embodiments of the present invention, in a second implementation manner of the sixth aspect of the embodiments of the present invention, when executing the step of updating a desktop of the second terminal according to the received desktop drawing file, the processor specifically executes the following steps of updating a desktop drawing file of the second terminal according to the received desktop drawing file, and displaying the desktop of the second terminal according to an updated desktop drawing file of the second terminal.

With reference to the sixth aspect, or either of the first and the second implementation manners of the sixth aspect of the embodiments of the present invention, in a third implementation manner of the sixth aspect of the embodiments of the present invention, when executing the step of displaying the desktop of the second terminal according to an updated desktop drawing file of the second terminal, the processor specifically executes the following step of replacing a desktop wallpaper of the second terminal and/or arranging a desktop icon of the second terminal, according to the updated desktop drawing file of the second terminal, where the desktop icon includes an icon of the desktop application, and/or an icon of the desktop widget, and/or an icon of the folder on the desktop.

With reference to the sixth aspect, or any one of the first to the third implementation manners of the sixth aspect of the embodiments of the present invention, in a fourth implementation manner of the sixth aspect of the embodiments of the present invention, when the at least one application interface element includes a desktop application, the desktop description file further includes a downloading link of the desktop application, and after executing the step of updating a desktop of the second terminal according to the received desktop drawing file, the processor is further configured to execute the following steps of when the desktop application of the first terminal is not installed on the second terminal, receiving an operation of tapping the uninstalled desktop application on the desktop, and downloading and installing the tapped desktop application by using the downloading link of the desktop application in the desktop description file.

With reference to the sixth aspect, or any one of the first to the fourth implementation manners of the sixth aspect of the embodiments of the present invention, in a fifth implementation manner of the sixth aspect of the embodiments of the present invention, the first desktop information file further includes a desktop preview image of the first terminal, and after executing the step of receiving a desktop drawing file shared by a first terminal, and before executing the step of updating a desktop of the second terminal according to the received desktop drawing file, the processor is further configured to execute the following steps of displaying the desktop preview image of the first terminal, and when a third operation is received, triggering the step of updating a desktop of the second terminal according to the received desktop drawing file, where the third operation is used to determine to use the received desktop drawing file.

It can be learned from the foregoing technical solutions that the embodiments of the present invention have the following advantages. A first terminal determines a desktop drawing file according to a desktop of the first terminal when a first operation of a user received by the first terminal meets a first preconfigured condition, where the desktop drawing file includes a desktop description file and a file package of at least one screen interface on the desktop of the first terminal, the desktop description file includes a location of at least one application interface element on the desktop of the first terminal, and the file package includes a thumbnail of the at least one application interface element, and the first terminal shares the determined desktop drawing file, so that a second terminal updates a desktop of the second terminal according to the shared desktop drawing file. At least one application interface element on at least one screen interface on a desktop of a mobile terminal is shared, so that sharing the desktop of the mobile terminal is implemented, and a requirement for sharing and using one or more entire screen interfaces on the desktop of the mobile terminal by the user is met.

DETAILED DESCRIPTION OF ILLUSTRATIVE EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by persons skilled in the art based on the embodiments of the present invention without creative efforts shall fall within the protection scope of the present invention.

It may be understood that, a desktop sharing method in the embodiments of the present invention involves execution bodies in two aspects. In a first aspect, a terminal sharing a desktop, which is referred to as a first terminal in the embodiments of the present invention, and in a second aspect, a terminal receiving a shared desktop, which is referred to as a second terminal in the embodiments of the present invention.

It may be understood that, a terminal draws a desktop by reading a desktop drawing file of the terminal. The desktop of the terminal may include multiple screen interfaces, and a location or a number of each screen interface on the desktop may be marked in the desktop drawing file. In the desktop sharing method in the embodiments of the present invention, the first terminal may share one screen interface on the desktop, or share multiple screen interfaces at the same time, which is not limited herein. After receiving a shared desktop drawing file, the second terminal may display a shared screen interface on a home screen interface on a desktop of the second terminal, or may display the shared screen interface on a new screen interface added on the desktop, or may replace a screen interface that is on the desktop of the second terminal and whose number is the same as a number of the shared screen interface, which is not limited herein.

Figure 1:
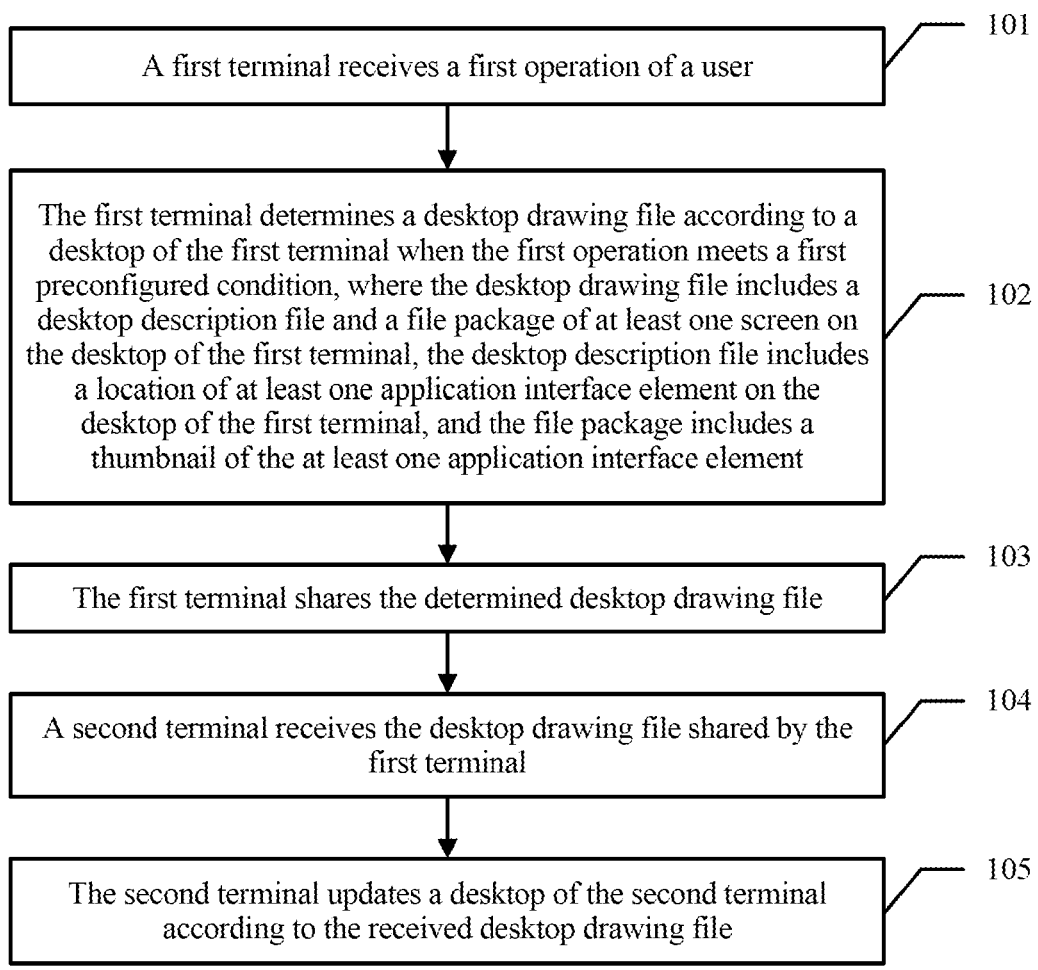
FIG. 1 is a schematic flowchart of a desktop sharing method according to an embodiment of the present invention.

Referring to FIG. 1, an embodiment of a desktop sharing method in an embodiment of the present invention includes the following steps.

101. A first terminal receives a first operation of a user.

The first terminal receives the first operation of the user, where the first operation is used to trigger desktop sharing.

It may be understood that, the first operation may have many types, correspondingly, a preset first preconfigured condition for meeting triggering of desktop sharing may also have many types. For example, optionally, the first operation may be a tap operation of the user, and the first preconfigured condition may be that the user taps a desktop sharing button. Therefore, when receiving an operation of tapping the desktop sharing button by the user, the first terminal may determine that the first operation meets the first preconfigured condition. Optionally, the first operation may also be a swipe operation of the user on a screen, and the first preconfigured condition may be a preset swiping track. Therefore, when determining that a swiping track of the user on the screen meets a preset condition, the first terminal may determine that the first operation meets the first preconfigured condition. According to an actual application situation, another first operation and a corresponding first preconfigured condition may be set, which is not limited herein.

Optionally, in another embodiment of the desktop sharing method in this embodiment of the present invention, when the first operation is a tap operation of the user and the first preconfigured condition is that the user taps a desktop sharing button, the desktop sharing button may be placed at multiple different locations. Optionally, the desktop sharing button may be directly placed on a desktop of the first terminal and may be displayed on each screen interface on the desktop. Optionally, the desktop sharing button may be displayed on a desktop editing interface, a second terminal enters the desktop editing interface and the desktop sharing button may then be displayed on the desktop editing interface only when the first terminal receives a second operation of the user and the second operation meets a second preconfigured condition, which is not limited herein.

102. The first terminal determines a desktop drawing file according to a desktop of the first terminal when the first operation meets a first preconfigured condition, where the desktop drawing file includes a desktop description file and a file package of at least one screen interface on the desktop of the first terminal, the desktop description file includes a location of at least one application interface element on the desktop of the first terminal, and the file package includes a thumbnail of the at least one application interface element.

When determining that the first operation meets the first preconfigured condition, the first terminal determines the desktop drawing file according to the desktop of the first terminal. The desktop drawing file may be used to draw a desktop or a screen interface on a desktop. The desktop drawing file includes the desktop description file and the file package of the at least one screen interface on the desktop of the first terminal, the desktop description file includes the location of the at least one application interface element on the desktop of the first terminal, and the file package includes the thumbnail of the at least one application interface element.

It should be noted that, the application interface element may be a desktop wallpaper, a desktop application, a desktop widget, or a folder on a desktop. In this embodiment, according to an application interface element on a screen interface on the desktop that is determined for sharing, the application interface element included in the desktop drawing file may be at least one of the desktop wallpaper, the desktop application, the desktop widget, or the folder on the desktop.

Optionally, when the first operation meets the first preconfigured condition, and before the first terminal determines the desktop drawing file, the first terminal may further receive an operation of selecting at least one application interface element that needs to be shared. The selected application interface element may be located on one screen interface, or may be located on multiple screen interfaces. The first terminal may make the determined desktop drawing file include only information about the selected application interface element and information about the screen interface on which the selected application interface element is located. That is, the shared desktop drawing file may not include information about an unselected application interface element, so that privacy of the user can be better protected.

Optionally, the desktop description file may be a file in an XML format, and the file package may be a compressed file package.

It should be noted that, the desktop description file describes each application interface element on the screen interface on the shared desktop, the location of each application interface element displayed on the desktop of the first terminal, and a package name and a name of each application interface element. In addition, the desktop description file includes a location at which the thumbnail of the application interface element is stored in the file package. The file package includes the thumbnail of the application interface element. The desktop drawing file that includes the desktop description file and the file package may be used to draw the desktop or the screen interface on the desktop.

Optionally, the desktop drawing file may further include a desktop preview image of the first terminal. Specifically, information about the desktop preview image may be recorded in the desktop description file, and the desktop preview image may be stored in the file package.

Optionally, when a shared screen interface includes a desktop application, the desktop description file may further include a downloading link of the desktop application, or the file package may include software of the desktop application. Correspondingly, for a desktop wallpaper, a desktop widget, or the like, the desktop description file may further include a corresponding downloading link, which is not limited herein.

103. The first terminal shares the determined desktop drawing file.

After determining the desktop drawing file, the terminal shares the determined desktop drawing file.

It should be noted that the desktop drawing file may be shared in many manners. Optionally, the first terminal shares the desktop drawing file directly to the second terminal by using a wireless connection. Optionally, the first terminal shares the desktop drawing file to a social network for the second terminal to download and use, and there may further be other manners, which is not limited herein.

104. A second terminal receives the desktop drawing file shared by the first terminal.

The second terminal receives a desktop file shared by the first terminal.

Optionally, the second terminal may directly receive, by using the wireless connection, the desktop drawing file transmitted by the first terminal.

Optionally, the second terminal may also download, from the social network, the desktop file shared by the first terminal.

105. The second terminal updates a desktop of the second terminal according to the received desktop drawing file.

After receiving the desktop drawing file shared by the first terminal, the second terminal updates the desktop of the second terminal according to the received desktop drawing file.

Specifically, the second terminal may update a desktop drawing file of the second terminal according to the received desktop drawing file, where the desktop drawing file of the second terminal is used to draw the desktop of the second terminal. The second terminal displays the desktop of the second terminal according to an updated desktop drawing file of the second terminal. Specifically, the second terminal may replace a desktop wallpaper of the second terminal and/or arrange a desktop icon of the second terminal, according to the updated desktop drawing file of the second terminal, where the desktop icon includes an icon of the desktop application, and/or an icon of the desktop widget, and/or an icon of the folder on the desktop. It may be understood that, the desktop icon of the second terminal is arranged according to the updated desktop drawing file of the second terminal. If the shared screen interface is displayed on an existing screen interface of the second terminal, it is equivalent to using the application interface element that is on the desktop of the first terminal and in the desktop drawing file determined by the first terminal to replace an application interface element on the desktop of the second terminal. If a screen interface is added on the second terminal to display the shared screen interface, it is equivalent to directly displaying, on the newly added screen interface on the desktop of the second terminal, the application interface element that is on the desktop of the first terminal and in the desktop drawing file determined by the first terminal.

Optionally, in another embodiment of the desktop sharing method according to this embodiment of the present invention, the received desktop drawing file may further include a desktop theme of the first terminal, and the second terminal may further apply the desktop theme of the first terminal.

Optionally, in another embodiment of the desktop sharing method according to this embodiment of the present invention, when the shared screen interface of the first terminal includes a desktop application, the desktop description file may further include a downloading link of the desktop application. If the desktop application on the screen interface of the first terminal is not installed on the second terminal, the second terminal may receive an operation of tapping the uninstalled desktop application on the desktop, and the second terminal may download the tapped desktop application by using a downloading link of the desktop application in the desktop description file.

Optionally, in another embodiment of the desktop sharing method according to this embodiment of the present invention, when a desktop application, which is not installed on the second terminal but is displayed on the shared screen interface of the first terminal, is displayed on the desktop of the second terminal, a special mark may be added on an icon of the displayed desktop application. For example, words such as "not downloaded" are added, or blurring display is used, which is not limited herein.

Optionally, in another embodiment of the desktop sharing method according to this embodiment of the present invention, a first desktop information file further includes the desktop preview image of the first terminal. After the second terminal receives the desktop drawing file shared by the first terminal, and before the second terminal updates the desktop of the second terminal according to the received desktop drawing file, the method may further include displaying, by the second terminal, the desktop preview image of the first terminal, and when a third operation is received, triggering the step of updating, by the second terminal, a desktop of the second terminal according to the received desktop drawing file, where the third operation is used to determine to use the received desktop drawing file.

In this embodiment of the present invention, a first terminal determines a desktop drawing file according to a desktop of the first terminal when a first operation of a user received by the first terminal meets a first preconfigured condition, where the desktop drawing file includes a desktop description file and a file package of at least one screen interface on the desktop of the first terminal, the desktop description file includes a location of at least one application interface element on the desktop of the first terminal, and the file package includes a thumbnail of the at least one application interface element, and the first terminal shares the determined desktop drawing file, so that a second terminal updates a desktop of the second terminal according to the shared desktop drawing file. At least one application interface element on at least one screen interface on a desktop of a mobile terminal is shared, so that sharing the desktop of the mobile terminal is implemented, and a requirement for sharing and using one or more entire screen interfaces on the desktop of the mobile terminal by the user is met.

For ease of understanding, the following uses a specific application scenario to describe the desktop sharing method in this embodiment of the present invention.

A user of the first terminal may be a popular verified account, a technology talent, or another well-known figure on microblog, and a user of the second terminal may be a follower of the user of the first terminal, a common user, or the like.

Figure 2:
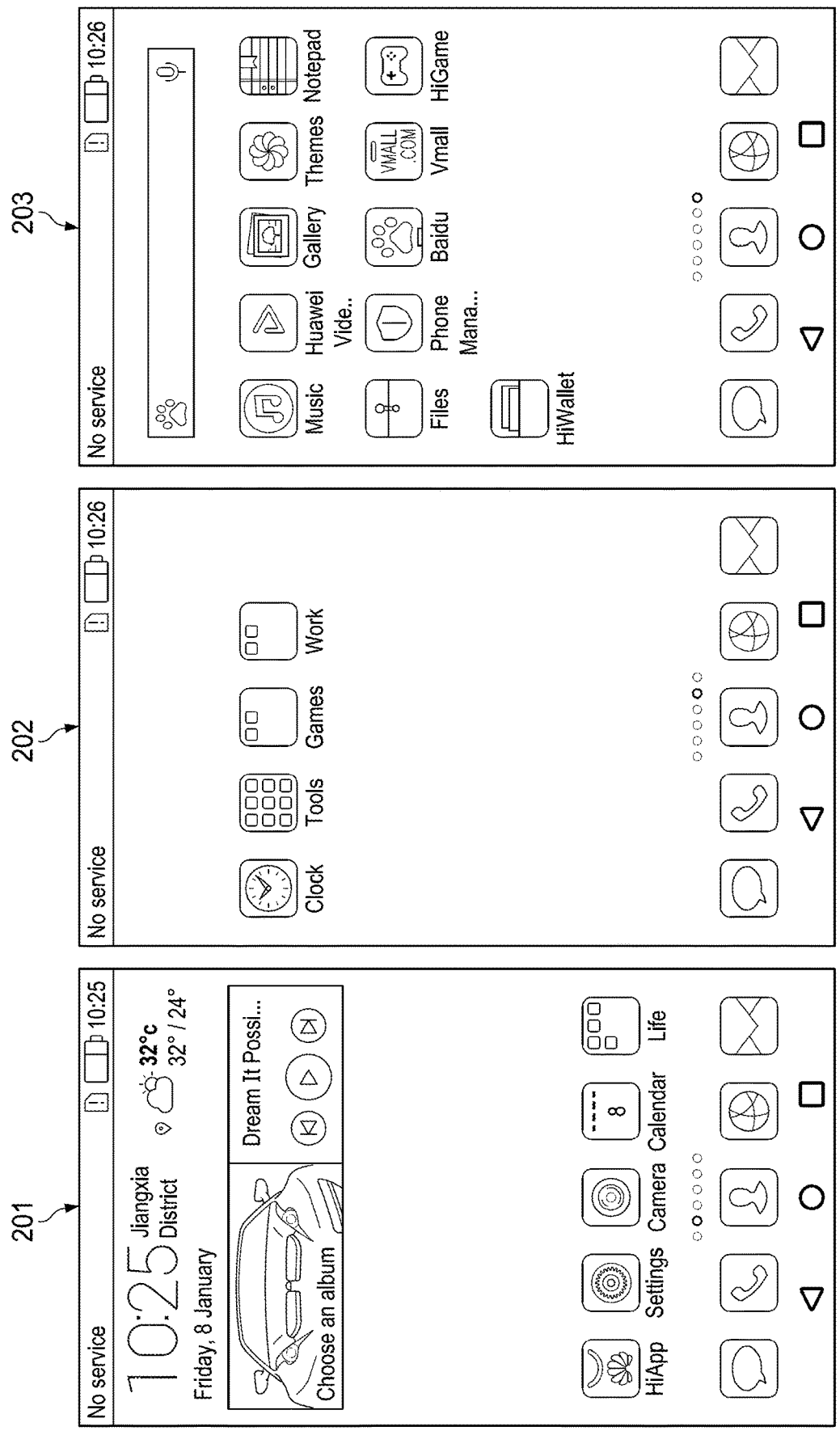
FIG. 2 is a schematic example diagram of a desktop sharing method according to an embodiment of the present invention.

FIG. 2 shows a schematic diagram of the desktop of the first terminal. It can be learned that, the desktop of the first terminal has three screen interfaces that are a screen interface 201, a screen interface 202, and a screen interface 203, as shown in FIG. 2.

Figure 3:
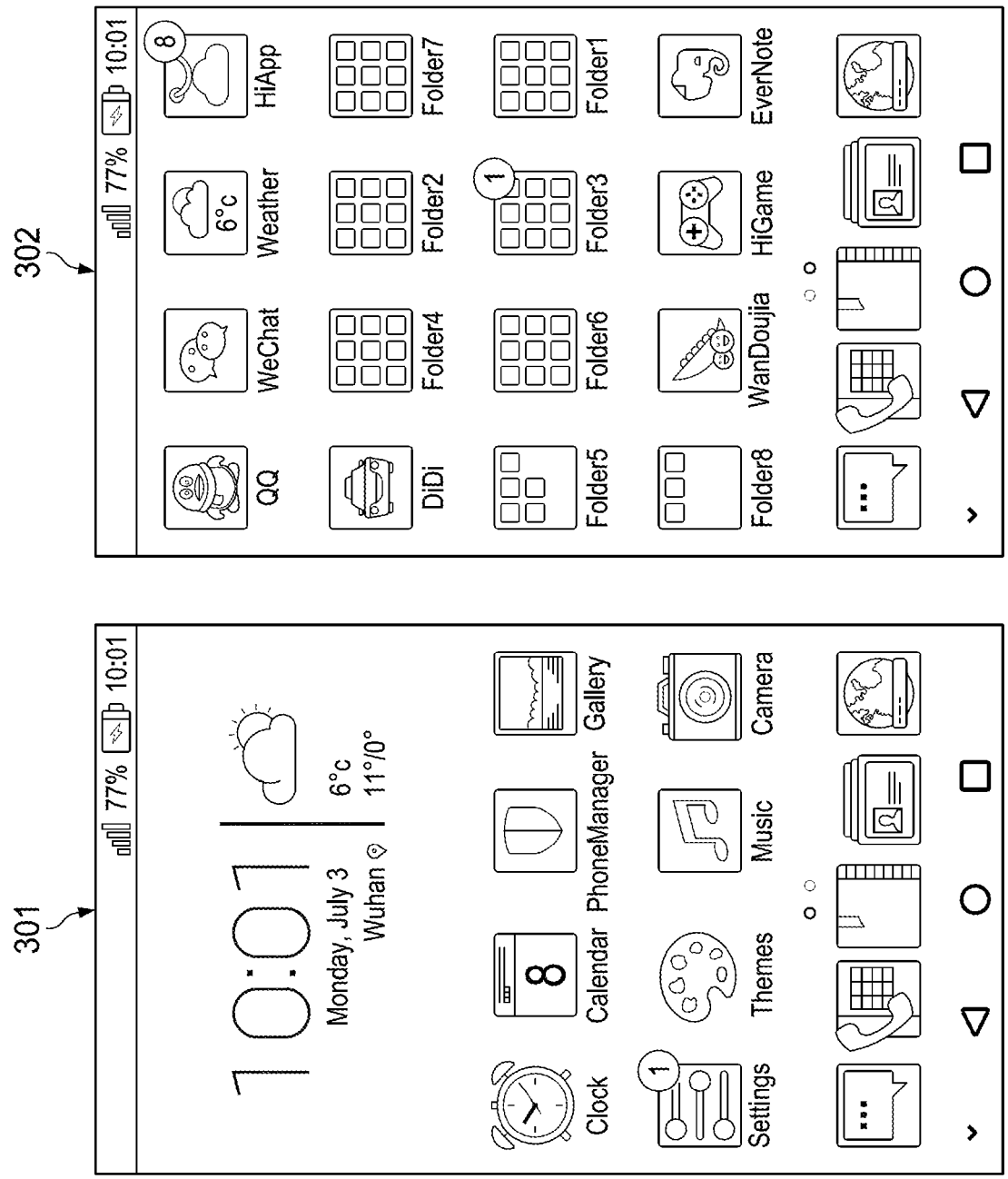
FIG. 3 is another schematic example diagram of a desktop sharing method according to an embodiment of the present invention.

FIG. 3 shows a schematic diagram of the desktop of the second terminal. It can be learned that, the desktop of the second terminal has two screen interfaces that are a screen interface 301 and a screen interface 302, as shown in FIG. 3.

Figure 4:
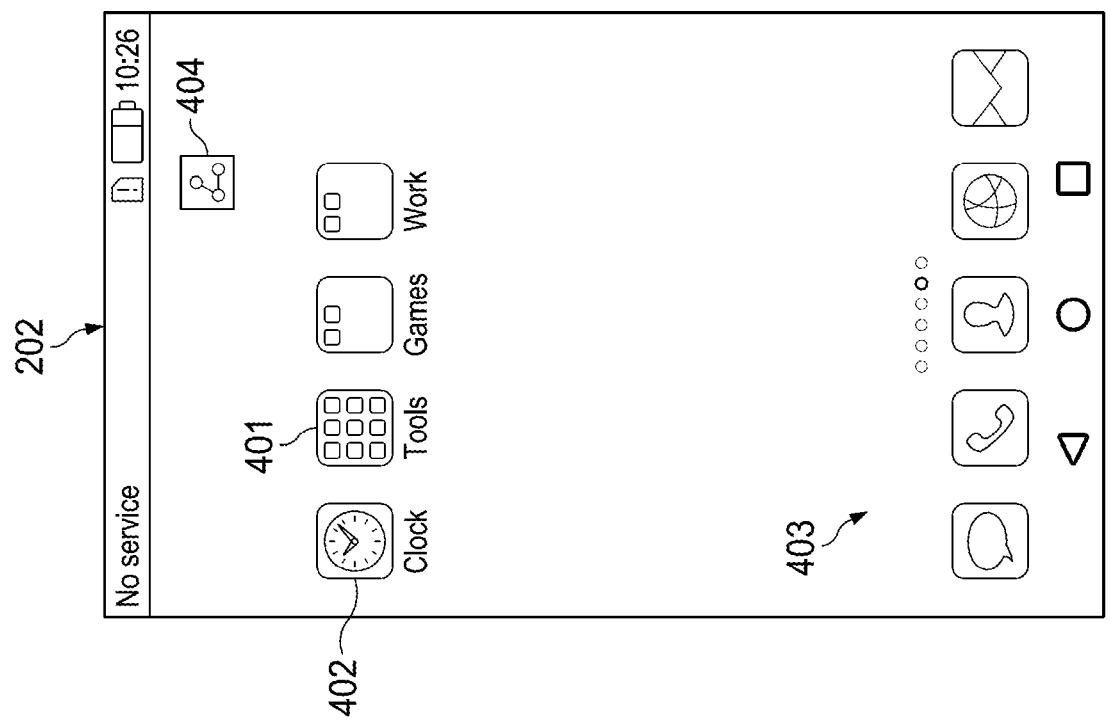
FIG. 4 is another schematic example diagram of a desktop sharing method according to an embodiment of the present invention.

In actual application, in one situation, the desktop sharing button may be directly displayed on each screen interface of the first terminal. As shown in FIG. 4, a desktop sharing button 404 is displayed on the screen interface 202.

Figure 5:
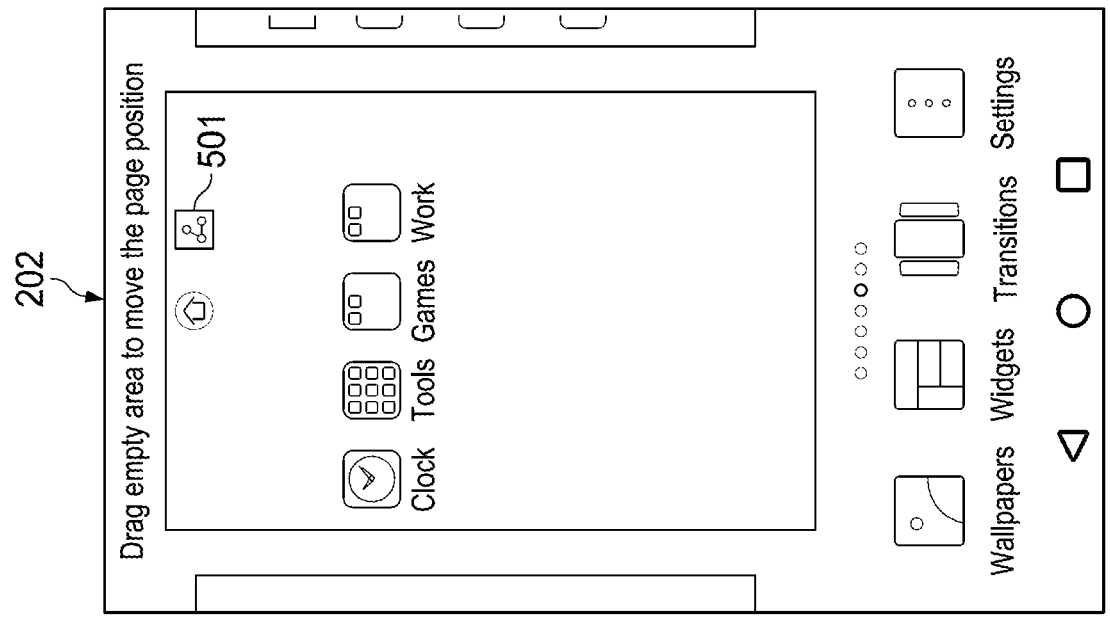
FIG. 5 is another schematic example diagram of a desktop sharing method according to an embodiment of the present invention.

In another situation, the screen interface 202 is displayed on the first terminal, and the first terminal receives an operation of touching and holding any one icon on the screen interface by the user. The first terminal enters a desktop editing mode. As shown in FIG. 5, in the desktop editing mode, a desktop sharing button 501 is displayed on the screen interface 202.

When the first terminal receives an operation of tapping the desktop sharing button 404 or the desktop sharing button 501 by the user, the first terminal pops up a sharing manner pop-up box for the user to select. The first terminal supports sharing to a social network by the user or sharing directly in a wireless direct connection (such as WIFI™ or BLUETOOTH®) manner.

The first terminal receives a sharing manner selected by the user (for example, sharing to a social network is selected).

In a scenario 1, the first terminal shares the currently displayed screen interface 202 by default. The first terminal determines a desktop drawing file, where the desktop drawing file includes a desktop description file and a file package. The desktop description file includes a location, a file name, a package name, and a downloading link of each application interface element on the screen interface 202. For example, the desktop description file includes a location of a utility folder 401 on the screen interface 202, where the utility folder 401 includes a name and an arranging location of an icon, a location and a downloading link of a clock application 402 on the screen interface 202, a location of an information widget 403 on the desktop, and related information about other desktop interface elements. The file package includes a thumbnail of the application interface elements, a desktop wallpaper, and a thumbnail of the screen interface 202.

The first terminal shares the determined desktop drawing file to the social network.

The second terminal downloads, from the social network, the desktop drawing file shared by the first terminal. The second terminal parses the desktop drawing file, first reads the thumbnail of the screen interface 202 included in the file package, and then displays the thumbnail of the screen interface 202.

The second terminal receives an operation of determining to use the desktop drawing file by the user. According to the selection of the user, there are several situations.

Figure 6:
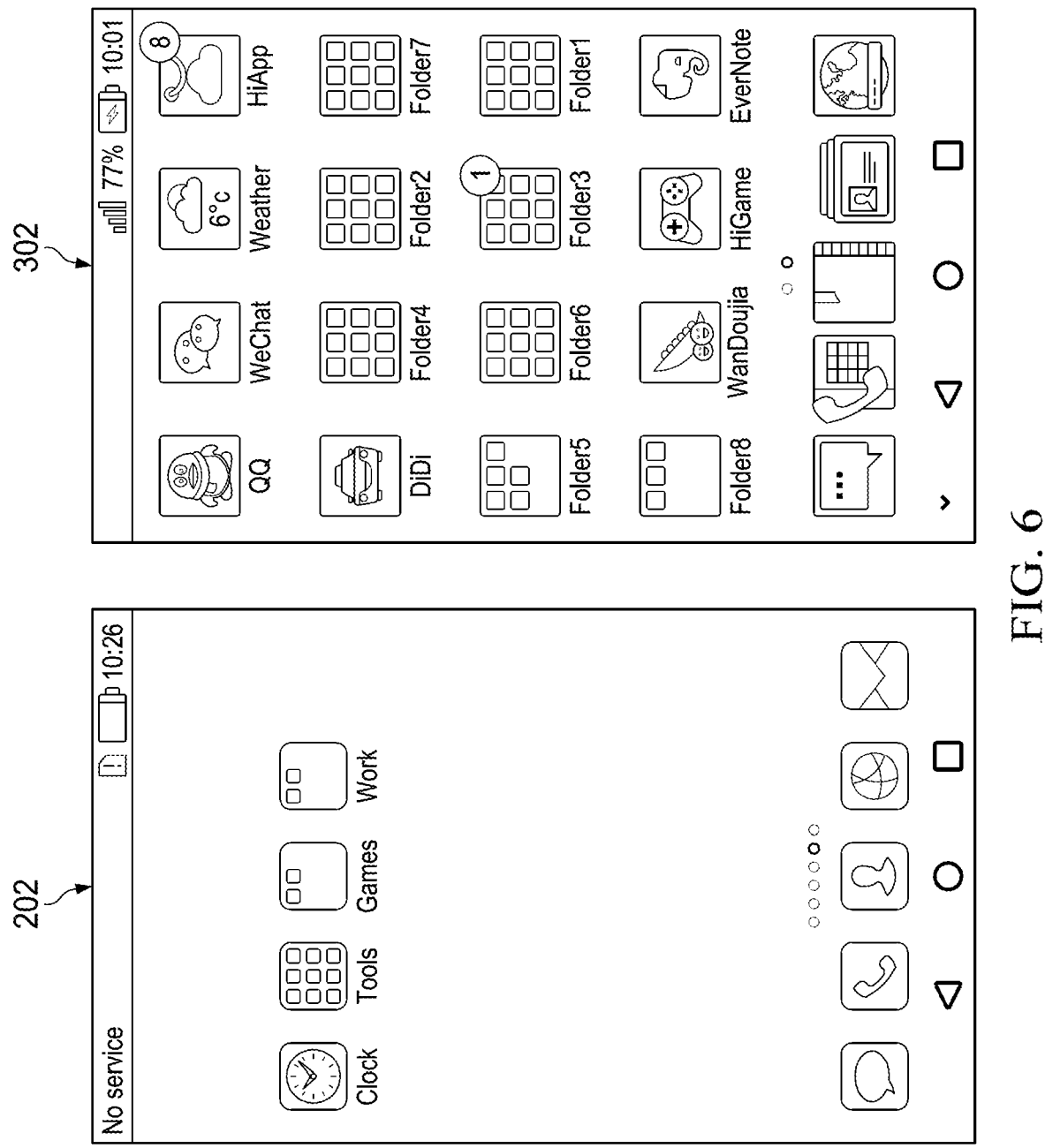
FIG. 6 is another schematic example diagram of a desktop sharing method according to an embodiment of the present invention.

1. The second terminal may use the screen interface 202 indicated by the desktop drawing file to replace a currently displayed screen interface (such as the screen interface 301) in the desktop drawing file of the second terminal, and an updated desktop of the second terminal is shown in FIG. 6.

Figure 7:
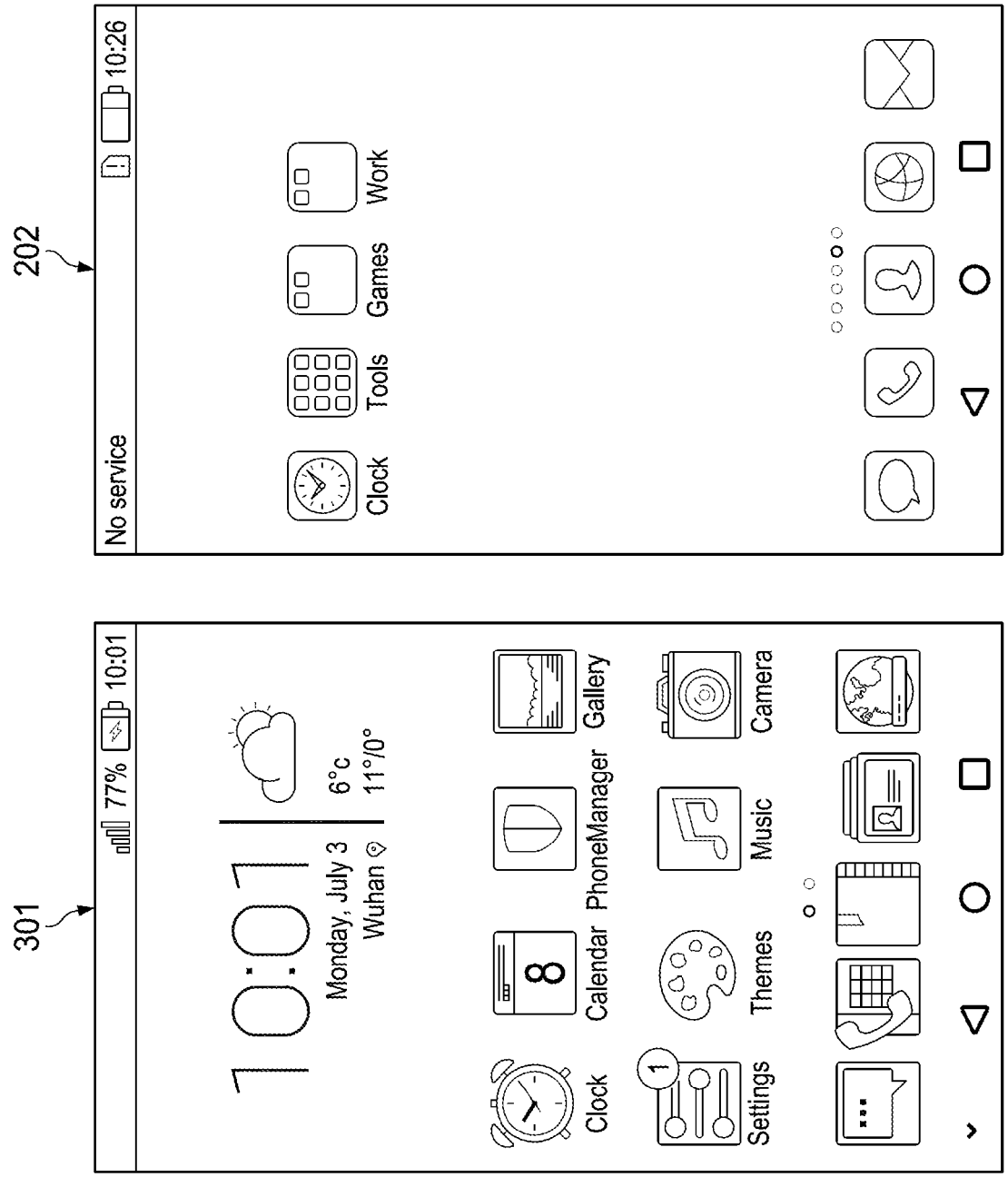
FIG. 7 is another schematic example diagram of a desktop sharing method according to an embodiment of the present invention.

2. The second terminal may use the screen interface 202 indicated by the desktop drawing file to replace a screen interface (such as the screen interface 302) that is in the desktop drawing file of the second terminal and whose number is the same as that of the screen interface 202, and an updated desktop of the second terminal is shown in FIG. 7.

Figure 8:
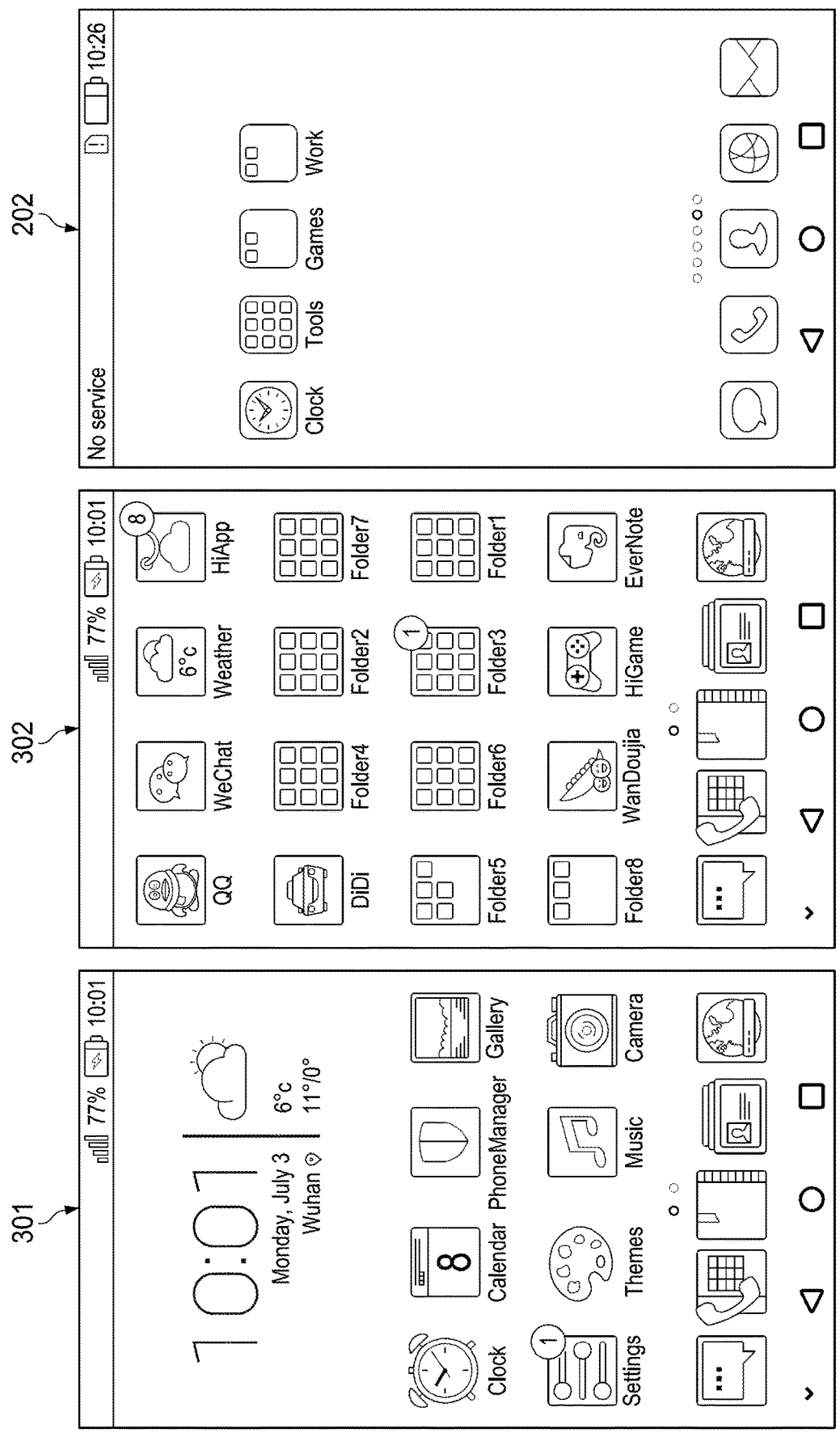
FIG. 8 is another schematic example diagram of a desktop sharing method according to an embodiment of the present invention.

3. The second terminal may add the screen interface 202 indicated by the desktop drawing file into the current desktop drawing file of the second terminal, and an updated desktop of the second terminal is shown in FIG. 8.

After the second terminal updates the desktop, if the clock application 402 is not installed on the second terminal, when receiving an operation of tapping the clock application 402 by the user, the second terminal may use the downloading link of the clock application 402 included in the desktop drawing file to download and install the application.

In a scenario 2, the first terminal allows the user to select several screen interfaces for sharing. If the user selects the screen interface 201 and the screen interface 202 for sharing, the first terminal determines a desktop drawing file, where the desktop drawing file includes a desktop description file and a file package. The desktop description file includes a location, a file name, a package name, and a downloading link of each application interface element on the screen interface 202 and the screen interface 203.

After receiving the desktop drawing file, and when updating the desktop drawing file of the second terminal according to the selection of the user, the second terminal may replace the desktop drawing file of the second terminal, or may add the desktop drawing file into the desktop drawing file of the second terminal.

The desktop drawing file determined by the first terminal may further include a desktop theme, a desktop wallpaper, or the like, and may specifically include a description and a downloading link of the desktop theme and a theme and a downloading link of the desktop wallpaper.

If a desktop theme or a desktop wallpaper on the second terminal is not changed when the second terminal updates the desktop, after downloading the desktop theme or the desktop wallpaper by using the downloading link, the second terminal may replace the desktop wallpaper with the downloaded desktop wallpaper and apply the downloaded desktop theme.

The following separately describes mobile terminals serving as a first terminal and a second terminal in embodiments of the present invention.

1. Mobile Terminal Serving as the First Terminal and Configured to Share a Desktop Referring to FIG. 9, an embodiment of a mobile terminal according to an embodiment of the present invention includes a first receiving module 901, configured to receive a first operation of a user, a determining module 902, configured to determine a desktop drawing file according to a desktop of the first terminal when the first operation received by the first receiving module 901 meets a first preconfigured condition, where the desktop drawing file includes a desktop description file and a file package of at least one screen interface on the desktop of the first terminal, the desktop description file includes a location of at least one application interface element on the desktop of the first terminal, and the file package includes a thumbnail of the at least one application interface element, and a sharing module 903, configured to share the determined desktop drawing file, so that a second terminal updates a desktop of the second terminal according to the shared desktop drawing file.

In this embodiment of the present invention, a determining module 902 determines a desktop drawing file according to a desktop of the first terminal when a first operation of a user received by a first receiving module 901 meets a first preconfigured condition, where the desktop drawing file includes a desktop description file and a file package of at least one screen interface on the desktop of the first terminal, the desktop description file includes a location of at least one application interface element on the desktop of the first terminal, and the file package includes a thumbnail of the at least one application interface element, and a sharing module 903 shares the determined desktop drawing file, so that a second terminal updates a desktop of the second terminal according to the shared desktop drawing file. At least one application interface element on at least one screen interface on a desktop of a mobile terminal is shared, so that sharing the desktop of the mobile terminal is implemented, and a requirement for sharing and using one or more entire screen interfaces on the desktop of the mobile terminal by the user is met.

The foregoing application interface element includes a desktop wallpaper, a desktop application, a desktop widget, or a folder on a desktop.

Optionally, when the at least one application interface element includes a desktop application, the desktop description file further includes a downloading link of the desktop application.

Optionally, the foregoing desktop drawing file further includes a desktop preview image of the first terminal.

Optionally, in another embodiment of the mobile terminal according to this embodiment of the present invention, the sharing module 903 is specifically configured to share the desktop drawing file directly to the second terminal by using a wireless connection, or share the desktop drawing file to a social network for the second terminal to download and use.

Figure 10:
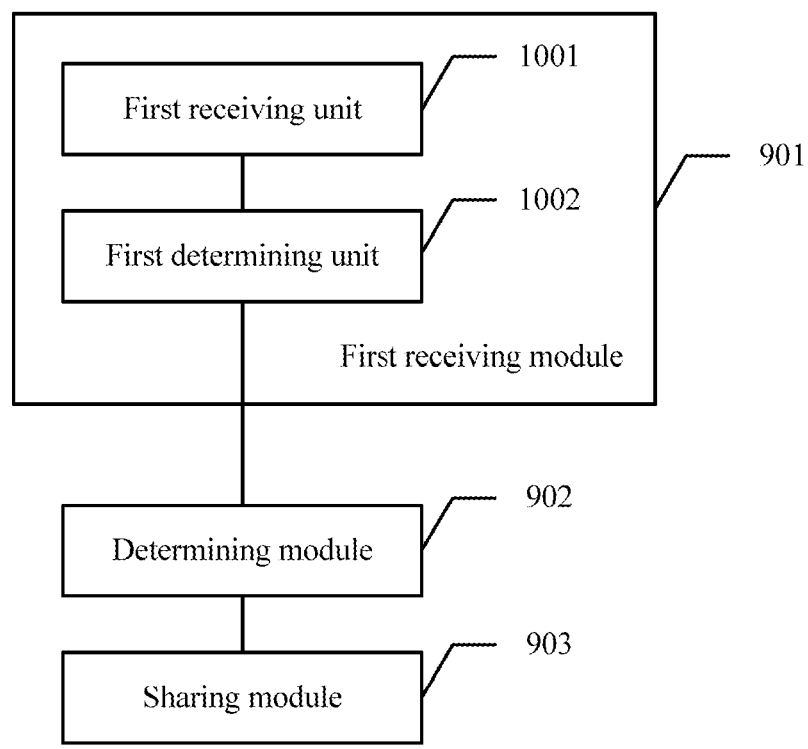
FIG. 10 is another schematic structural diagram of a mobile terminal according to an embodiment of the present invention.

Optionally, referring to FIG. 10, in another embodiment of the mobile terminal according to this embodiment of the present invention, the foregoing first receiving module 901 specifically includes a first receiving unit 1001, configured to receive a tap operation of the user, and a first determining unit 1002, configured to when the first receiving unit 1001 receives an operation of tapping a desktop sharing button by the user, determine that the first operation meets the first preconfigured condition.

Figure 11:
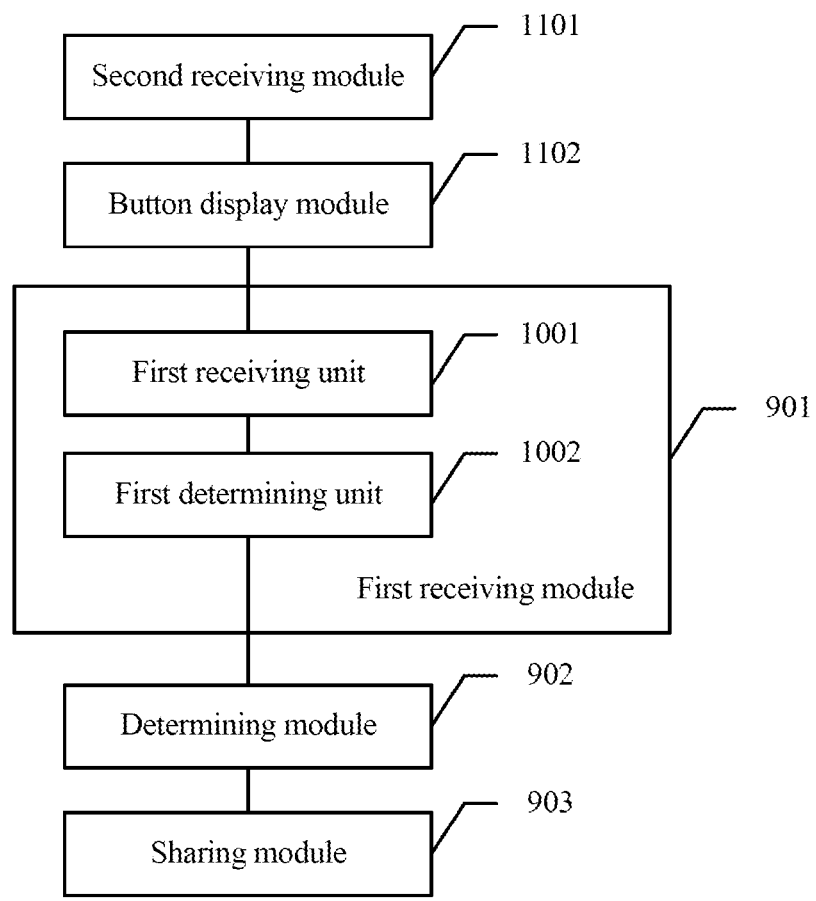
FIG. 11 is another schematic structural diagram of a mobile terminal according to an embodiment of the present invention.

Optionally, referring to FIG. 11, in another embodiment of the mobile terminal according to this embodiment of the present invention, the mobile terminal shown in FIG. 10 further includes a second receiving module 1101, configured to receive a second operation of the user, and a button display module 1102, configured to display a desktop editing interface when the second operation received by the second receiving module 1101 meets a second preconfigured condition, where the desktop sharing button is displayed on the desktop editing interface.

Figure 9:
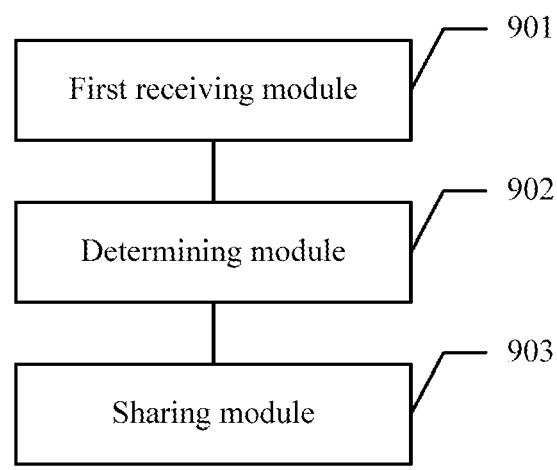
FIG. 9 is a schematic structural diagram of a mobile terminal according to an embodiment of the present invention.
Figure 12:
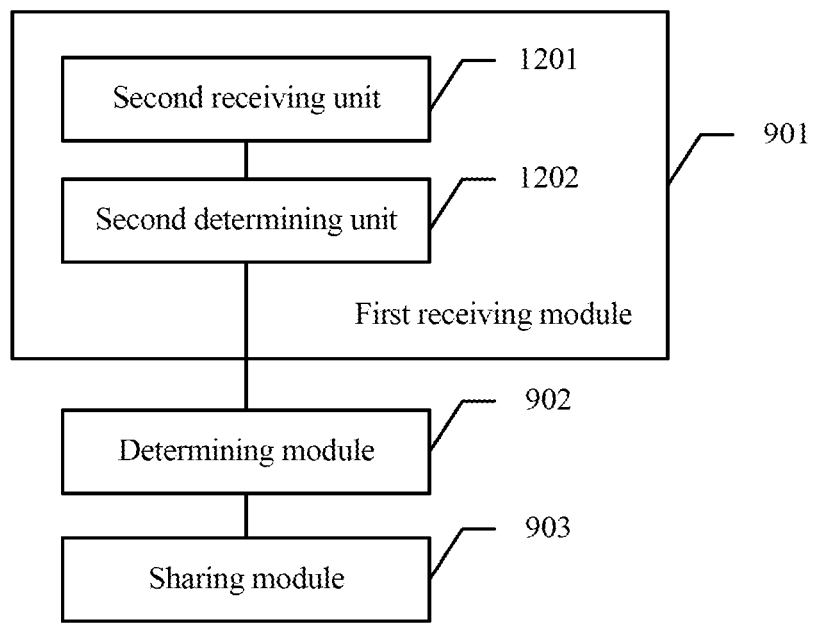
FIG. 12 is another schematic structural diagram of a mobile terminal according to an embodiment of the present invention.

Optionally, referring to FIG. 12, in another embodiment of the mobile terminal according to this embodiment of the present invention, the first receiving module 901 in the mobile terminal shown in FIG. 9 specifically includes a second receiving unit 1201, configured to receive a swipe operation of the user on a screen, and a second determining unit 1202, configured to when a swiping track meets a preset condition, determine that the first operation meets the first preconfigured condition.

2. Mobile Terminal Serving as the Second Terminal and Configured to Use a Shared Desktop Referring to FIG. 13, another embodiment of a mobile terminal according to an embodiment of the present invention includes a third receiving module 1301, configured to receive a desktop drawing file shared by a first terminal, where the desktop drawing file includes a desktop description file and a file package of at least one screen interface on a desktop of the first terminal, the desktop description file includes a location of at least one application interface element on the desktop of the first terminal, and the file package includes a thumbnail of the at least one application interface element, and an update module 1302, configured to update a desktop of the second terminal according to the desktop drawing file received by the third receiving module 1301.

In this embodiment of the present invention, a third receiving module 1301 receives a desktop drawing file shared by a first terminal, and an update module 1302 updates a desktop of the second terminal according to the received desktop drawing file, so that the desktop of the second terminal better meets a user's requirement and man-machine interaction performance of the terminal is improved.

The foregoing application interface element includes a desktop wallpaper, a desktop application, a desktop widget, or a folder on a desktop.

Figure 14:
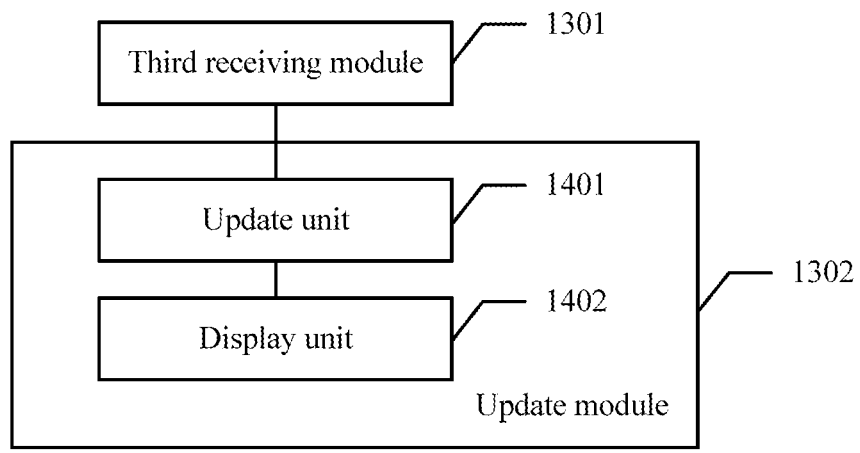
FIG. 14 is another schematic structural diagram of a mobile terminal according to an embodiment of the present invention.
Figure 15:
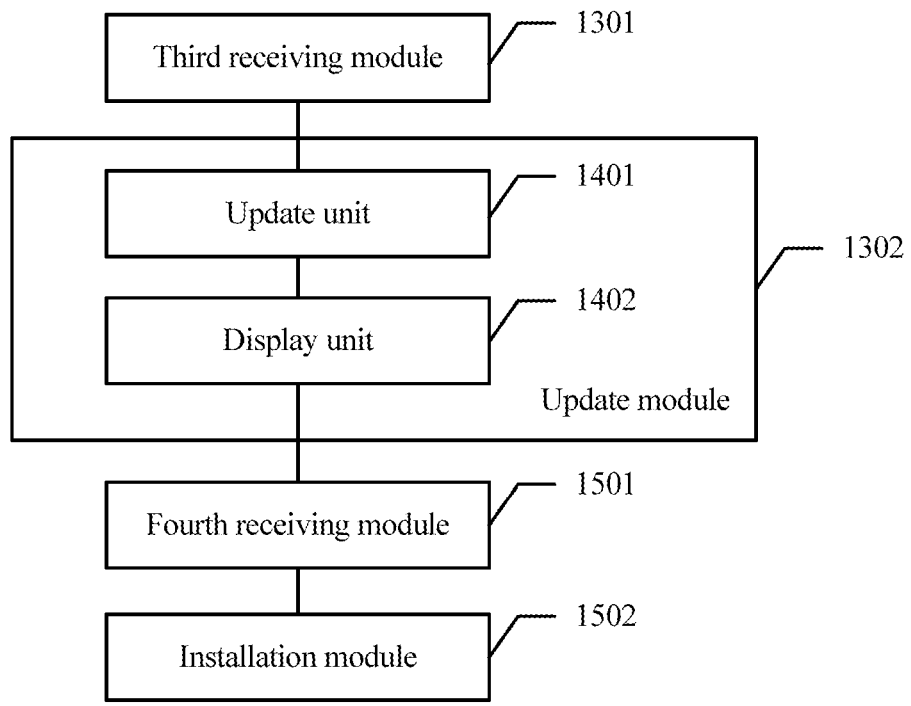
FIG. 15 is another schematic structural diagram of a mobile terminal according to an embodiment of the present invention.

Optionally, referring to FIG. 14, in another embodiment of the mobile terminal according to this embodiment of the present invention, the foregoing update module 1302 specifically includes an update unit 1401, configured to update a desktop drawing file of the second terminal according to the received desktop drawing file, and a display unit 1402, configured to display the desktop of the second terminal according to a desktop drawing file of the second terminal updated by the update unit 1401.

Optionally, in another embodiment of the mobile terminal according to this embodiment of the present invention, the foregoing display unit 1402 is specifically configured to replace a desktop wallpaper of the second terminal and/or arrange a desktop icon of the second terminal, according to the desktop drawing file of the second terminal updated by the update unit, where the desktop icon includes an icon of the desktop application, and/or an icon of the desktop widget, and/or an icon of the folder on the desktop.

Figure 13:
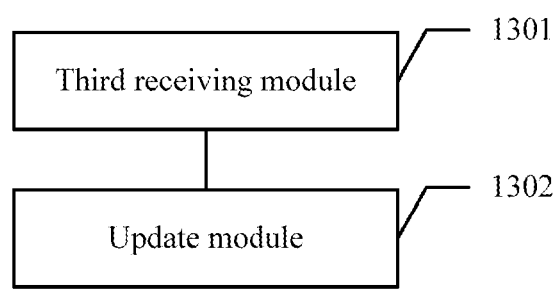
FIG. 13 is another schematic structural diagram of a mobile terminal according to an embodiment of the present invention.

Optionally, referring to FIG. 13, in another embodiment of the mobile terminal according to this embodiment of the present invention, when the at least one application interface element includes a desktop application, the desktop description file further includes a downloading link of the desktop application.

The mobile terminal further includes a fourth receiving module 1301, configured to when the desktop application of the first terminal is not installed on the second terminal, receive an operation of tapping the uninstalled desktop application on the desktop, and an installation module 1302, configured to download and install the tapped desktop application by using the downloading link of the desktop application in the desktop description file.

Figure 16:
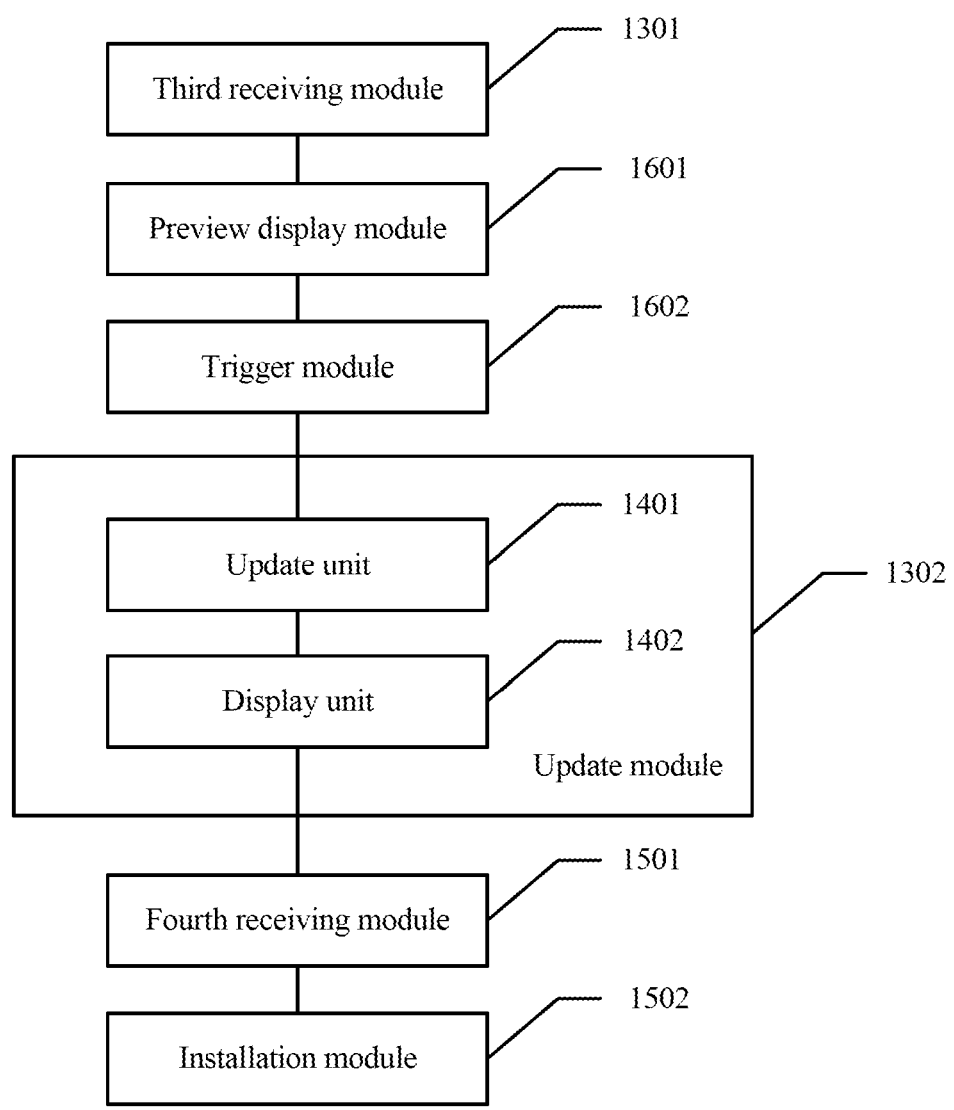
FIG. 16 is another schematic structural diagram of a mobile terminal according to an embodiment of the present invention.

Optionally, referring to FIG. 16, in another embodiment of the mobile terminal according to this embodiment of the present invention, the first desktop information file further includes a desktop preview image of the first terminal.

The mobile terminal further includes a preview display module 1601, configured to display the desktop preview image of the first terminal, and a trigger module 1602, configured to trigger the update module 1302 when a third operation is received, where the third operation is used to determine to use the received desktop drawing file.

Figure 17:
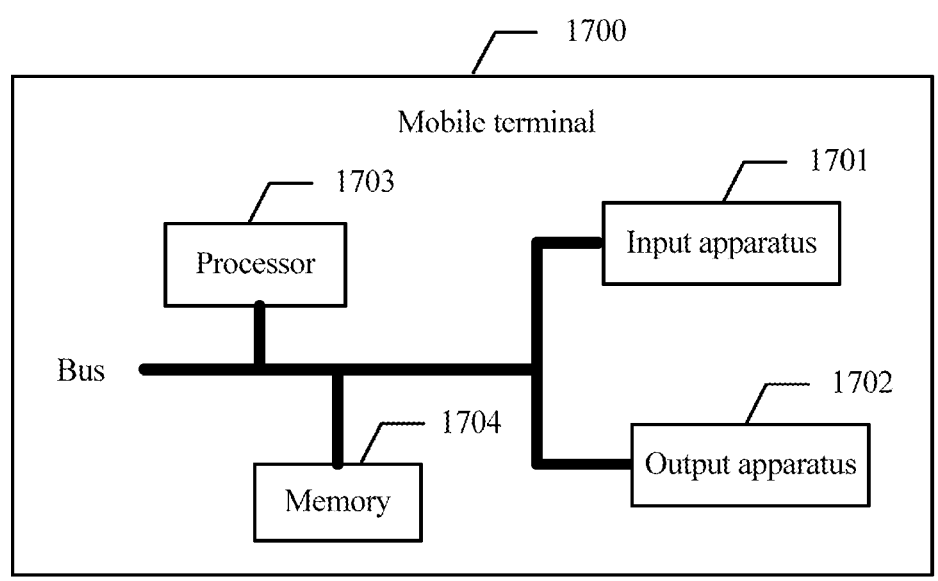
FIG. 17 is another schematic structural diagram of a mobile terminal according to an embodiment of the present invention.

The foregoing describes the mobile terminal in this embodiment of the present invention from a perspective of a unitized functional entity. The following describes a mobile terminal in an embodiment of the present invention from a perspective of hardware processing. Referring to FIG. 17, FIG. 17 is a schematic structural diagram of a mobile terminal according to an embodiment of the present invention, where the mobile terminal may be a mobile terminal that serves as a first terminal, or may be a mobile terminal that serves as a second terminal. Another embodiment of the mobile terminal 1700 in this embodiment of the present invention includes an input apparatus 1701, an output apparatus 1702, a processor 1703, and a memory 1704 (there may be one or more processors 1703 in the mobile terminal 1700, and one processor 1703 is used as an example in FIG. 17). In some embodiments of the present invention, the input apparatus 1701, the output apparatus 1702, the processor 1703, and the memory 1704 may be connected by using a bus or by other means, and FIG. 17 uses a bus connection as an example.

When the mobile terminal shown in FIG. 17 is a mobile terminal that serves as the first terminal, the processor 1703 is configured to execute the following steps by invoking an operation instruction stored in the memory 1704 receiving a first operation of a user, determining a desktop drawing file according to a desktop of the first terminal when the first operation meets a first preconfigured condition, where the desktop drawing file includes a desktop description file and a file package of at least one screen interface on the desktop of the first terminal, the desktop description file includes a location of at least one application interface element on the desktop of the first terminal, and the file package includes a thumbnail of the at least one application interface element, and sharing the determined desktop drawing file, so that a second terminal updates a desktop of the second terminal according to the shared desktop drawing file.

In some embodiments of the present invention, the application interface element includes a desktop wallpaper, a desktop application, a desktop widget, or a folder on a desktop.

In some embodiments of the present invention, when the at least one application interface element includes a desktop application, the desktop description file further includes a downloading link of the desktop application.

In some embodiments of the present invention, the desktop drawing file further includes a desktop preview image of the first terminal.

In some embodiments of the present invention, when executing the step of sharing the determined desktop drawing file, the processor 1703 is specifically configured to execute the following step of directly sharing the desktop drawing file to the second terminal by using a wireless connection, or sharing the desktop drawing file to a social network for the second terminal to download and use.

In some embodiments of the present invention, when executing the step of receiving a first operation of a user, the processor 1703 is specifically configured to execute the following steps of receiving a tap operation of the user, and when an operation of tapping a desktop sharing button by the user is received, determining that the first operation meets the first preconfigured condition.

In some embodiments of the present invention, before executing the step of receiving a tap operation of the user, the processor 1703 is further configured to execute the following steps of receiving a second operation of the user, and entering a desktop editing interface when the second operation meets a second preconfigured condition, where the desktop sharing button is displayed on the desktop editing interface.

In some embodiments of the present invention, when executing the step of receiving a first operation of a user, the processor 1703 specifically executes the following steps of receiving a swipe operation of the user on a screen, and when a swiping track meets a preset condition, determining that the first operation meets the first preconfigured condition.

When the mobile terminal shown in FIG. 17 is a mobile terminal that serves as the second terminal, the processor 1703 is configured to execute the following steps by invoking an operation instruction stored in the memory 1704, including receiving a desktop drawing file shared by a first terminal, where the desktop drawing file includes a desktop description file and a file package of at least one screen interface on a desktop of the first terminal, the desktop description file includes a location of at least one application interface element on the desktop of the first terminal, and the file package includes a thumbnail of the at least one application interface element, and updating a desktop of the second terminal according to the received desktop drawing file.

In some embodiments of the present invention, the application interface element includes a desktop wallpaper, a desktop application, a desktop widget, or a folder on a desktop.

In some embodiments of the present invention, when executing the step of updating a desktop of the second terminal according to the received desktop drawing file, the processor 1703 specifically executes the following steps of updating a desktop drawing file of the second terminal according to the received desktop drawing file, and displaying the desktop of the second terminal according to an updated desktop drawing file of the second terminal.

In some embodiments of the present invention, when executing the step of displaying the desktop of the second terminal according to an updated desktop drawing file of the second terminal, the processor 1703 specifically executes the following step of replacing a desktop wallpaper of the second terminal and/or arranging a desktop icon of the second terminal, according to the updated desktop drawing file of the second terminal, where the desktop icon includes an icon of the desktop application, and/or an icon of the desktop widget, and/or an icon of the folder on the desktop.

In some embodiments of the present invention, when the at least one application interface element includes a desktop application, the desktop description file further includes a downloading link of the desktop application.

After executing the step of updating a desktop of the second terminal according to the received desktop drawing file, the processor 1703 is further configured to execute the following steps of when the desktop application of the first terminal is not installed on the second terminal, receiving an operation of tapping the uninstalled desktop application on the desktop, and downloading and installing the tapped desktop application by using the downloading link of the desktop application in the desktop description file.

In some embodiments of the present invention, the first desktop information file further includes a desktop preview image of the first terminal.

After executing the step of receiving a desktop drawing file shared by a first terminal, and before executing the step of updating a desktop of the second terminal according to the received desktop drawing file, the processor 1703 is further configured to execute the following steps of displaying the desktop preview image of the first terminal, and when a third operation is received, triggering the step of updating a desktop of the second terminal according to the received desktop drawing file, where the third operation is used to determine to use the received desktop drawing file.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present invention. The foregoing storage medium includes any medium that can store program code, such as a universal serial bus (USB) flash drive, a removable hard disk, a read-only memory (ROM), a random access memory (RAM), a magnetic disk, or an optical disc.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A method, comprising:
    receiving, by a second terminal, a desktop drawing file shared by a first terminal, wherein the desktop drawing file comprises a desktop description file and a file package of a screen interface on a first desktop of the first terminal, the desktop description file comprises a location of an application interface element on the first desktop of the first terminal, the desktop description file further comprises a desktop preview image of the first terminal, and the file package comprises a thumbnail of the application interface element;
    displaying, by the second terminal, the desktop preview image of the first terminal according to the desktop description file; and
    after the displaying the desktop preview image and in response to receiving an operation, replacing, by the second terminal, a second desktop of the second terminal using the desktop drawing file shared by the first terminal, wherein the second terminal uses the operation to determine to use the desktop drawing file, and wherein the replacing comprises:
        based on that an application displayed in the first desktop of the first terminal is not installed on the second terminal:

displaying, by the second terminal, an added mark associated with a desktop application icon of the application not installed on the second terminal, the added mark indicating that the application is not installed on the second terminal, wherein the desktop application icon and the added mark correspond to the application interface element of the application displayed in the first desktop of the first terminal, receiving, by the second terminal, a user operation on the desktop application icon associated with the added mark displayed in the replaced second desktop of the second terminal, and in response to the user operation on the desktop application icon associated with the added mark, downloading, by the second terminal, the application based on information of the application in the desktop drawing file, wherein the information of the application is included in the desktop drawing file shared by the first terminal.

2. The method according to claim 1, wherein the displaying comprises:

blurrily displaying, by the second terminal, the desktop application icon.

3. The method according to claim 1, wherein the desktop description file comprises a corresponding location of each of a plurality of application interface elements on a plurality of screen interfaces on the first desktop of the first terminal, wherein the desktop description file further comprises a file name, a package name, and a downloading link of the each of the plurality of application interface elements, wherein the file package comprises a corresponding thumbnail of the each of the plurality of application interface elements and thumbnails of the plurality of screen interfaces, wherein the desktop drawing file further comprises a desktop wallpaper and a desktop theme, and wherein the plurality of application interface elements comprise a desktop application and a desktop widget.

4. The method according to claim 3, wherein the plurality of application interface elements comprise the desktop application, the desktop widget, and a folder on the first desktop.

5. The method according to claim 3, wherein the replacing comprises:

replacing, by the second terminal, a second desktop drawing file of the second terminal with the desktop drawing file shared by the first desktop drawing file; and displaying, by the second terminal, the second desktop of the second terminal according to the replaced second desktop drawing file of the second terminal.

6. The method according to claim 5, wherein the displaying the second desktop of the second terminal comprises:

replacing, by the second terminal, a desktop wallpaper of the second terminal; and arranging a desktop icon of the second terminal.

7. The method according to claim 1, wherein the replacing the second desktop of the second terminal comprises:

replacing, by the second terminal, a desktop theme of the second terminal with the desktop theme comprised in the desktop drawing file.

8. The method of claim 1, the receiving the desktop drawing file comprising:

downloading, by the second terminal from a social network, the desktop drawing file shared by the first terminal.

9. The method of claim 1, wherein the added mark associated with the desktop application icon indicates that the application displayed in the first desktop of the first terminal is not installed on the second terminal.

10. A second terminal, comprising:

at least one processor; and a non-transitory memory storing a program to be executed by the at least one processor, the program including instructions to:

receive a desktop drawing file shared by a first terminal, wherein the desktop drawing file comprises a desktop description file and a file package of a screen interface on a first desktop of the first terminal, the desktop description file comprises a location of an application interface element on the first desktop of the first terminal, the desktop description file further comprises a desktop preview image of the first terminal, and the file package comprises a thumbnail of the application interface element;

display the desktop preview image of the first terminal according to the desktop description file; and after displaying the desktop preview image and in response to receiving an operation, replace a second desktop of the second terminal using the desktop drawing file shared by the first terminal, wherein the second terminal uses the operation to determine to use the desktop drawing file, and wherein the instructions to replace the second desktop of the second terminal include instructions to:

based on that an application displayed in the first desktop of the first terminal is not installed on the second terminal:

display an added mark associated with a desktop application icon of the application not installed on the second terminal, the added mark indicating that the application is not installed on the second terminal, wherein the desktop application icon and the added mark correspond to the application interface element of the application displayed in the first desktop of the first terminal, receive a user operation on the desktop application icon associated with the added mark displayed in the replaced second desktop of the second terminal, and in response to the user operation on the desktop application icon associated with the added mark, download, by the second terminal, the application based on information of the application in the desktop drawing file, wherein the information of the application is included in the desktop drawing file.

11. The second terminal according to claim 10, wherein the instructions to display the added mark include instructions to blurrily display the desktop application icon.

12. The second terminal according to claim 10, wherein the desktop description file comprises a corresponding location of each of a plurality of application interface elements on a plurality of screen interfaces on the first desktop of the first terminal, wherein the desktop description file further comprises a file name, a package name, and a downloading link of the each of the plurality of application interface elements, wherein the file package comprises a corresponding thumbnail of the each of the plurality of application interface elements and thumbnails of the plurality of screen interfaces, wherein the desktop drawing file further comprises a desktop wallpaper and a desktop theme, and wherein the plurality of application interface elements comprise a desktop application and a desktop widget.

13. The second terminal according to claim 12, wherein the plurality of application interface elements comprise the desktop application, the desktop widget, and a folder on the first desktop.

14. The second terminal according to claim 12, wherein the instructions to replace the second desktop of the second terminal include instructions to:

replace a second desktop drawing file of the second terminal with the desktop drawing file shared by the first terminal; and display the second desktop of the second terminal according to the replaced second desktop drawing file of the second terminal.

15. The second terminal according to claim 14, wherein the instructions to display the second desktop of the second terminal include instructions to:

replace a desktop wallpaper of the second terminal; and arrange a desktop icon of the second terminal using the second desktop drawing file of the second terminal.

16. The second terminal according to claim 10, wherein the instructions to replace the second desktop of the second terminal include instructions to:

replace a desktop theme of the second terminal with the desktop theme comprised in the desktop drawing file.

17. A non-transitory computer-readable medium having instructions stored thereon that, when executed by a second terminal, cause the second terminal to perform operations, the operations comprising:

receiving a desktop drawing file shared by a first terminal, wherein the desktop drawing file comprises a desktop description file and a file package of a screen interface on a first desktop of the first terminal, the desktop description file comprises a location of an application interface element on the first desktop of the first terminal, the desktop description file further comprises a desktop preview image of the first terminal, and the file package comprises a thumbnail of the application interface element;

displaying, by the second terminal, the desktop preview image of the first terminal according to the desktop description file; and after the displaying the desktop preview image and in response to receiving an operation, replacing a second desktop of the second terminal using the desktop drawing file shared by the first terminal, wherein the second terminal uses the operation to determine to use the desktop drawing file, and wherein the replacing comprises:

based on that an application displayed in the first desktop of the first terminal is not installed on the second terminal:

displaying an added mark associated with a desktop application icon of the application not installed on the second terminal, the added mark indicating that the application is not installed on the second terminal, wherein the desktop application icon and the added mark correspond to the application interface element of the application displayed in the first desktop of the first terminal, receiving, by the second terminal, a user operation on the desktop application icon associated with the added mark displayed in the replaced second desktop of the second terminal, and in response to the user operation on the desktop application icon associated with the added mark, downloading, by the second terminal, the application based on information of the application in the desktop drawing file, wherein the information of the application is included in the desktop drawing file shared by the first terminal.

18. The non-transitory computer-readable medium according to claim 17, wherein the displaying comprises:

blurrily displaying, by the second terminal, the desktop application icon.

19. The non-transitory computer-readable medium according to claim 17, wherein the desktop description file comprises a corresponding location of each of a plurality of application interface elements on a plurality of screen interfaces on the first desktop of the first terminal, wherein the desktop description file further comprises a file name, a package name, and a downloading link of the each of the plurality of application interface elements, wherein the file package comprises a corresponding thumbnail of the each of the plurality of application interface elements and thumbnails of the plurality of screen interfaces, wherein the desktop drawing file further comprises a desktop wallpaper and a desktop theme, and wherein the plurality of application interface elements comprise a desktop application and a desktop widget.

20. The non-transitory computer-readable medium according to claim 19, wherein the plurality of application interface elements comprise the desktop application, the desktop widget, and a folder on the first desktop.

* * * * *